(12) United States Patent
Wang

(10) Patent No.: US 10,637,949 B2
(45) Date of Patent: *Apr. 28, 2020

(54) TRANSPARENT SHARDING OF TRAFFIC ACROSS MESSAGING BROKERS

(71) Applicant: salesforce.com, inc., San Francisco, CA (US)

(72) Inventor: Xiaodan Wang, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/804,910

(22) Filed: Nov. 6, 2017

(65) Prior Publication Data
US 2018/0063271 A1 Mar. 1, 2018

Related U.S. Application Data

(63) Continuation of application No. 14/614,146, filed on Feb. 4, 2015, now Pat. No. 9,813,516.

(60) Provisional application No. 61/941,293, filed on Feb. 18, 2014.

(51) Int. Cl.
*H04L 29/08* (2006.01)
*H04L 12/24* (2006.01)
*G06F 16/27* (2019.01)
*H04L 12/26* (2006.01)

(52) U.S. Cl.
CPC ........ *H04L 67/2809* (2013.01); *G06F 16/278* (2019.01); *H04L 41/0668* (2013.01); *H04L 43/0817* (2013.01); *H04L 67/1002* (2013.01)

(58) Field of Classification Search
CPC ............. H04L 67/2809; H04L 41/0668; G06F 16/278
USPC ........................................................ 709/235
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Non-Final Office Action for U.S. Appl. No. 14/614,146 dated Mar. 10, 2017, 7 pages.

(Continued)

*Primary Examiner* — Thanh T Nguyen
(74) *Attorney, Agent, or Firm* — Jaffery, Watson, Mendonsa & Hamilton, LLP

(57) ABSTRACT

Embodiments regard transparent sharding of traffic across messaging brokers. An embodiment of a method of sharding message traffic across messaging brokers includes providing a message sharding service for message sharding among a plurality of registered message brokers, wherein providing the message sharding service includes applying a current message sharding strategy; and sharding messages among the registered message brokers according to the current message sharding strategy, including registering the message brokers and assigning message queues to registered message brokers according to the current message sharding strategy; wherein the current message sharding strategy is one of a plurality of message sharding strategies.

23 Claims, 9 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,006,264 A * | 12/1999 | Colby .................. H04L 29/06 709/220 |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,486,678 B1 * | 2/2009 | Devanagondi ...... H04L 49/3072 370/394 |
| 7,620,655 B2 | 11/2009 | Larsson et al. |
| 9,584,439 B2 | 2/2017 | Leafe et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0111642 A1 * | 6/2004 | Peles .................. H04L 29/06 726/4 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0258465 A1 * | 11/2007 | Ma .................. H04W 28/08 370/395.53 |
| 2009/0177744 A1 | 7/2009 | Marlow et al. |
| 2012/0233668 A1 | 9/2012 | Leafe et al. |
| 2013/0060834 A1 | 3/2013 | Paramasivam et al. |
| 2013/0205028 A1 | 8/2013 | Crockett et al. |
| 2013/0238785 A1 | 9/2013 | Hawk et al. |
| 2013/0247034 A1 | 9/2013 | Messerli |
| 2013/0304903 A1 | 11/2013 | Mick et al. |
| 2014/0059226 A1 | 2/2014 | Messerli et al. |
| 2014/0211665 A1 | 7/2014 | Voccio et al. |
| 2014/0214745 A1 | 7/2014 | Walsh |
| 2014/0214915 A1 | 7/2014 | Dragon et al. |
| 2014/0215057 A1 | 7/2014 | Walsh et al. |
| 2014/0215443 A1 | 7/2014 | Voccio et al. |
| 2014/0282889 A1 | 9/2014 | Ishaya et al. |
| 2015/0066587 A1 | 3/2015 | Glommen et al. |
| 2015/0186184 A1 * | 7/2015 | Kim .................. G06F 9/5088 718/104 |
| 2015/0235308 A1 | 8/2015 | Mick et al. |
| 2015/0237157 A1 | 8/2015 | Wang |
| 2016/0188376 A1 * | 6/2016 | Rosas .............. G06F 16/24568 718/105 |
| 2017/0093700 A1 | 3/2017 | Gilley et al. |
| 2017/0139736 A1 | 5/2017 | Messerli |

OTHER PUBLICATIONS

Notice of Allowance for U.S. Appl. No. 14/614,146 dated Jul. 5, 2017, 15 pages.

Supplemental Notice of Allowance for U.S. Appl. No. 14/614,146 dated Aug. 4, 2017, 12 pages.

(56) References Cited

OTHER PUBLICATIONS

Supplemental Notice of Allowance for U.S. Appl. No. 14/614,146 dated Jul. 21, 2017, 12 pages.

* cited by examiner

TRANSPARENT SHARDING OF TRAFFIC ACROSS MESSAGING BROKERS

CROSS REFERENCE TO RELATED APPLICATIONS

This United States continuation patent application is related to, and claims priority to U.S. patent application Ser. No. 14/614,146 filed Feb. 4, 2015, entitled "Transparent Sharding of Traffic across Messaging Brokers", now U.S. Pat. No. 9,813,516 issued Nov. 7, 2017, and also is related to and claims priority to U.S. Provisional Patent Application No. 61/941,293 filed Feb. 18, 2014, entitled "Transparent Sharding of Traffic Across Messaging Brokers", the entire contents of which are both incorporated herein by reference.

TECHNICAL FIELD

Embodiments relate to techniques for computer database operation. More particularly, embodiments relate to transparent sharding of traffic across messaging brokers.

BACKGROUND

In a computer database system, a database shard is a horizontal partition in a database or search engine of a database system, wherein the database system includes multiple databases servers.

In a conventional operation, brokers may be configured as active/passive pairs, where queues are assigned to a single, active broker. The passive broker then is available upon a failure of the active broker.

However, the storing of every message on a single broker negatively affects system performance during peak loads, while the passive broker remains unused most of the time, resulting in compromises in performance and equipment usage.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
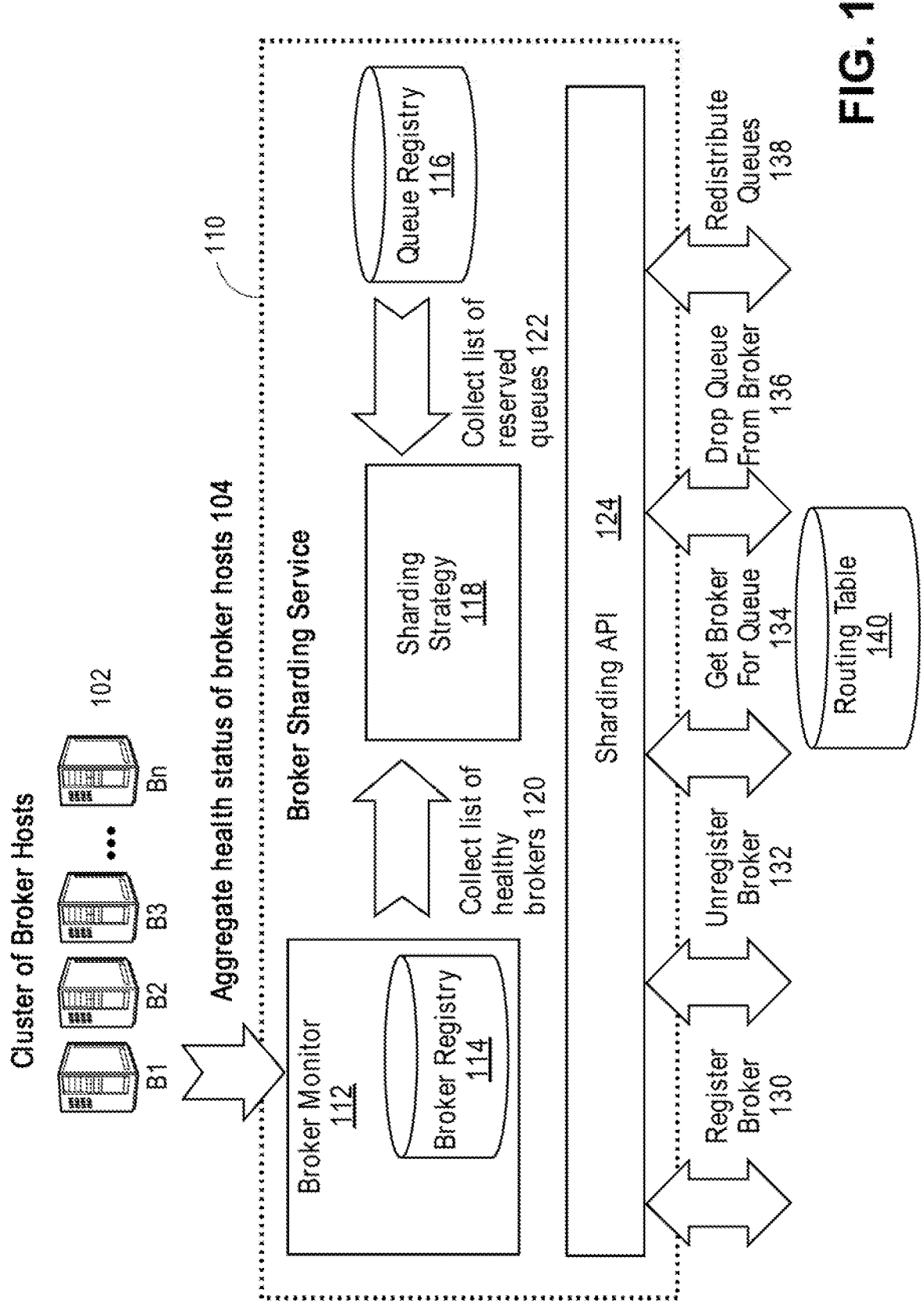
FIG. 1 illustrates a broker sharding service according to an embodiment.

In the following description, numerous specific details are set forth. However, embodiments may be practiced without these specific details. In other instances, well-known circuits, structures and techniques have not been shown in detail in order not to obscure the understanding of this description.

In a computing environment, a database system may store data in multiple database servers. In such operation, a "database shard", or simply referred to as a "shard", is a horizontal partition in a database or search engine. Each individual partition may be referred to as a shard or database shard. Horizontal partitioning is a database design principle whereby rows of a database table (referring to elements for a particular entry) are held separately in a database, rather than being split into columns. Each such partition forms part of a shard, which may in turn be located on a separate database server or physical location.

In a conventional operation, Qpid™ message broker servers (which may also be referred to herein as message brokers, or simply brokers) deployed for message queues are configured as active/passive pairs, wherein all queues are assigned to a single, active broker, leaving the remaining passive broker mostly idle for high availability reasons. Qpid is a trademark of The Apache Software Foundation, Qpid being an open source messaging system implementing the Advanced Messaging Queuing Protocol (AMQP), an open standard application layer protocol for messaging.

However, in large systems, as traffic is, for example, migrated to Qpid message brokers, storing every message on a single broker will impact enqueue/dequeue performance during peak load. In some embodiments, in order to preempt potential resource bottlenecks (such as memory and processor limitations) on a single broker, traffic is sharded and distributed across multiple brokers, wherein the distribution may be horizontally scaled beyond two brokers.

In some embodiments, a service in a database system provides for sharding across multiple message brokers. In conventional operation, message brokers are concurrently configured as active/passive, with the passive broker being idle most of the time. Sharding across multiple message brokers allows for preempting memory pressures at peak load as traffic grows and distributing load evenly among brokers by RAC node, wherein "RAC node" refers to Oracle® Real Application Clusters. In such operation, there are issues to be addressed, including the migration of existing queues once deployed; the preservation of round-robin fairness within same RAC node and tier; and no longer having a process simply fall back on a second broker when a first broker is out of queues.

In many large distributed messaging services, the decision to horizontally scale computing resources (such as processor, memory, storage, and other resources) across multiple machines (referred to as sharding) is tightly coupled with other components of the system. As such, changing the sharding strategy to provide, for instance, better load distribution or replication generally requires significant changes to the code for the system. In some embodiments, broker sharding may be provided as a service for clusters of messaging brokers to distribute messaging load evenly across multiple brokers and to provide scalability and high availability on top of an asynchronous job processing infrastructure. In some embodiments, sharding APIs (Application Programming Interfaces) utilized for building such a broker sharding service implement multiple forms of sharding, thus avoiding the need for extensive re-coding.

In some embodiments, broker sharding is provided as a service, thereby decoupling the broker sharding strategy from the remaining components of the messaging service. As described herein, in some embodiments a set of sharding APIs is offered by such a broker sharding service. This decoupled approach allows implementers to customize and swap sharding algorithms to satisfy, for example, different performance bounds, business requirements, availability guarantees, network conditions, or user preferences. In some embodiments, the current sharding strategy may be swapped in response to, for example, a change in current conditions, such as a change in traffic levels, or a change in a user preference. In an example, a sharding service can monitor for resource utilization on the broker hosts and dynamically redistribute traffic for service level guarantees, or replicate queuing resources across multiple brokers to improve availability guarantees.

In some embodiments, broker sharding as a service framework is an intermediate layer between broker servers (such as Qpid broker servers), which makes queuing resources available for use, and the routing table, which regulates messaging traffic by reserving queuing resources. In some embodiments, the broker sharding service provides APIs for allocating queuing resources from the set of available brokers. In some embodiments, consumers (such as the routing table) of this service can choose from among multiple sharding strategies in order to, for example, make trade-offs between availability and scalability goals depending on application requirements.

In some embodiments, implementation details for broker sharding are abstracted via the APIs that allow service consumers to dynamically and seamlessly swap sharding strategies. In some embodiments, at least two sharding strategies are provided that can be configured during application server startup, the sharding strategies being RAC node-based sharding and active/passive sharding. In operation, the RAC node-based sharding allows load balancing by evenly distributing customer traffic across two or more broker servers. The active/passive sharding offers simplicity for debugging issues that arise in production.

In some embodiments, transparent broker sharding across multiple message brokers provides the following:

(1) Broker sharding as a service framework for achieving scalability and high availability across N brokers;

(2) A set of sharding APIs (which specifically may be hardened APIs, hardening referring to the writing of API code to address security concerns) for abstracting management of queuing resources on brokers; and (3) Multiple versions of sharding with the ability to make performance trade-offs by swapping between strategies.

Message queue systems can process hundreds of millions of user and internal jobs daily (wherein the term "jobs" refers to messages). In an example, a message queue in the salesforce.com system is a highly distributed, asynchronous job scheduling and processing system for messages currently spanning 600 distinct job types. These jobs include both customer facing jobs (generating dashboard reports) and internal jobs (cleaning up database rows for inactive tenants). Jobs are organized by job type/tenant combination in which each combination corresponds to a distinct physical queue residing on one Qpid broker. In a particular embodiment of an asynchronous job scheduling (Message Queue) framework, these jobs are queued on Apache Qpid message broker servers. Application servers that process these jobs subscribe to queues from the Qpid brokers and pull messages to be de-queued, executed, and finally discarded. In some embodiments, between the application servers and the Qpid brokers is a routing table, which maintains a mapping of message types and tenants to physical queues on the Qpid message brokers. In this example, queues are identified by a named component, such as "Q123", and a broker identification (ID), such as a unique 15-character broker ID. A routing table may be as described in U.S. patent application Ser. No. 13/841,489, published as U.S. Patent Application Publication No. 2014/0075445, which application is incorporated by reference in its entirety.

In some embodiments, broker sharding as a service framework operates as an intermediate layer between the broker servers and the routing table. In one embodiment, multiple broker servers are deployed to each production instance serving as active and passive roles respectively. In some embodiments, the routing table only maps message types and tenants to physical queues on the active broker, while the passive broker is kept idle and void of traffic.

In general operation with active-passive broker implementation, if the active broker fails or otherwise stops operating, new and existing messages are moved to the passive broker and a switch is flipped to mark the passive server as active. In this manner, application servers are only required to subscribe to and allocate queues from the active broker. However, this structure presents several challenges: (1) modification of the active/passive configuration requires tedious code changes to both the routing table and application servers, (2) slower recovery occurs because once the active broker stops operating, all message processing stops until each message is recovered on the passive broker, and (3) the processing load cannot be distributed by horizontally scaling messaging traffic across both (or N) brokers.

In some embodiments, addressing these problems, a transparent sharding is provided as a service framework that serves as an intermediate layer between the routing table and broker servers in a system. In such operation, the sharding service offers common APIs for allocating queuing resources from the set of available brokers. In turn, consumers of this service can choose among multiple sharding strategies to make trade-offs between availability and scalability goals depending on application requirements. Further, implementation details are abstracted via APIs that allow consumers to seamlessly swap sharding strategies.

FIG. 1 illustrates a broker sharding service according to an embodiment. In some embodiments, a database system may include a cluster of message broker servers (which may be referred to as broker hosts, illustrated as broker hosts B1 through Bn) 102, a routing table 140, and a broker sharding service 110 between the broker hosts 102 and the routing table 140. In some embodiments, a routing operation may utilize the routing table as a consumer and an Apache Qpid broker as a queuing resource. However, embodiments are not limited by this implementation, and the consumer may be any application that needs to allocate new queuing resources on a set of N message broker servers.

In some embodiments, the broker sharding service includes a broker monitor 112, including a broker registry 114, and a queue registry 116. In some embodiments, the broker sharding service 110 may aggregate health status of broker hosts 104, wherein the broker sharding service 110 is to utilize the broker monitor 112 to collect a list of healthy brokers 120 and the queue registry 116 to collect a list of reserved queues 122. In some embodiments, such information is used in connection with a current sharding strategy 118, wherein the current sharding strategy is one of a plurality of possible sharding strategies and wherein the current sharding strategy may be switched to a different sharding strategy as required.

In some embodiments, the broker sharding service 110 includes the provision of sharding APIs 124. In some embodiments, the following APIs are made available via the broker sharding as a service framework:

(a) Register Broker 130: In some embodiments, a Qpid message broker 102 makes its queuing resources available for use by first registering with the sharding service 110. The sharding service 110 maintains the registry 114 of these message brokers and can optionally implement the broker monitor 112 that periodically queries registered message brokers for health status (wherein the health status may include heap and CPU load, for example).

(b) Unregister Broker 132: In some embodiments, the API removes a particular message broker from consideration by the sharding service 110, meaning that no new queues will be assigned to this message broker and existing queues will be redistributed across the remaining available message brokers according to the sharding strategy 118. In some embodiments, two sources can remove a message broker: First, application servers may run a quorum based health checker for detecting connectivity issues with the broker (network partition, broker failure, excess load, etc.) and explicitly request that the problematic broker be removed from the sharding service. A quorum-based health checker may include operation as described in U.S. patent application Ser. No. 13/841,588, published as U.S. Patent Application Publication No. 2014/0075017, which application is incorporated by reference in its entirety. Second, alternatively, the sharding service 110 may implement the broker monitor 112 that pings the message broker for liveliness and that removes a message broker if the broker becomes unreachable.

(3) Get Broker for Queue 134: In some embodiments, the API allows the routing table 140 to request a new queue for use. In some embodiments, the sharding service 110 finds and returns an available Qpid broker server (or multiple brokers for replication) by applying a specified sharding strategy 118 and using broker health and the assignment of existing queues to brokers as input.

(4) Drop queue from Broker 136: When a queue is no longer used by the routing table 140, the routing table 140 may invoke this API to drop the queue from the message broker. The dropping of the queue then frees up capacity on the broker.

(5) Redistribute Queues 138: In some embodiments, the routing table 140 may invoke this API to redistribute existing queues among the registered set of message brokers. In some embodiments, the sharding service 110 may choose to migrate an existing queue to a different broker depending on the sharding strategy 118 (such as to achieve load balancing, replication, or availability goals). In an implementation, the migration of a queue is initiated by the routing table 140 when the routing table 140 detects external state changes such as broker failure or excess load.

However, embodiments are not limited to these particular APIs, and may include different or additional APIs depending on a particular implementation.

In some embodiments, the broker sharding service APIs are invoked by the routing table sweeper job to determine (1) the destination message broker for queues assigned to new routing rules, and 2) the correct message broker for existing routing rules that are currently assigned to a wrong broker according to a sharding strategy. Upon the sharding feature being enabled, messages are migrated on a subset of existing queues to a different message broker in order to conform to a sharding strategy. A main contribution of the broker sharding service for sharding operation is to decouple routing and scheduling decisions from the sharding strategy and allow for future sharding strategies that trade-off availability and load balancing goals.

In some embodiments, multiple sharding strategies (such as sharding strategy 118 illustrated in FIG. 1) are implemented that can be configured during application server startup. In some embodiments, the current sharding strategy may be switched to a different strategy as, for example, conditions or preferences change. In some embodiments, the multiple sharding strategies include, but are not limited to:

(1) RAC Node-Based Sharding:

RAC node-based sharding uses the parent RAC node identifier of messages assigned to a queue to load balance traffic across N Qpid message brokers. In an operation in which customers or tenants are partitioned by RAC node, this feature may be applied to partition messages from various tenants. Further, because performance engineers actively monitor tenant to RAC node assignments in production data centers for load balancing of database resources, RAC node-based sharding may inherit these load balancing benefits without requiring additional cost or overhead. Specifically, tenants that generate large database loads are more likely to incur high messaging volume.

In some embodiments, sharding by RAC node (QpidBrokerShardingByRacNode) includes the following characteristics:

(a) Physical queues are assigned to message brokers based on RAC node;

(b) When running the routing table sweeper job, the sharding service queries for the latest list of active Qpid brokers and physical queues reserved on each broker; and (c) When reserving a new queue, the preferred message broker is determined via modulo hashing of RAC node ID into the list of available brokers.

(2) Active/Passive Sharding:

Active/passive sharding may be provided primarily for legacy purposes. Due to the simplicity of the active/passive algorithm (i.e., one destination broker for all queues), this makes for a useful tool when there is a need for debugging production issues by isolating problems on a single broker.

In some embodiments, sharding by active/passive broker operation (QpidBrokerShardingByActivePassive) includes the following characteristics:

(a) All physical queues are assigned to a single active broker;

(b) When running the routing table sweeper job, the sharding service queries for the latest list of active Qpid brokers and physical queues reserved on each broker; and (c) The sharding service chooses the active broker as follows:

(i) If no queues are currently reserved or the queues all point to a failed broker, then select the broker with a lowest lexicologically ordered identification (ID) (wherein each broker is assigned a unique ID at creation), or (ii) Otherwise, count the number of queues assigned to each broker and choose the broker with the most queues reserved; and (d) The preferred broker is always the current active broker.

Figure 2:
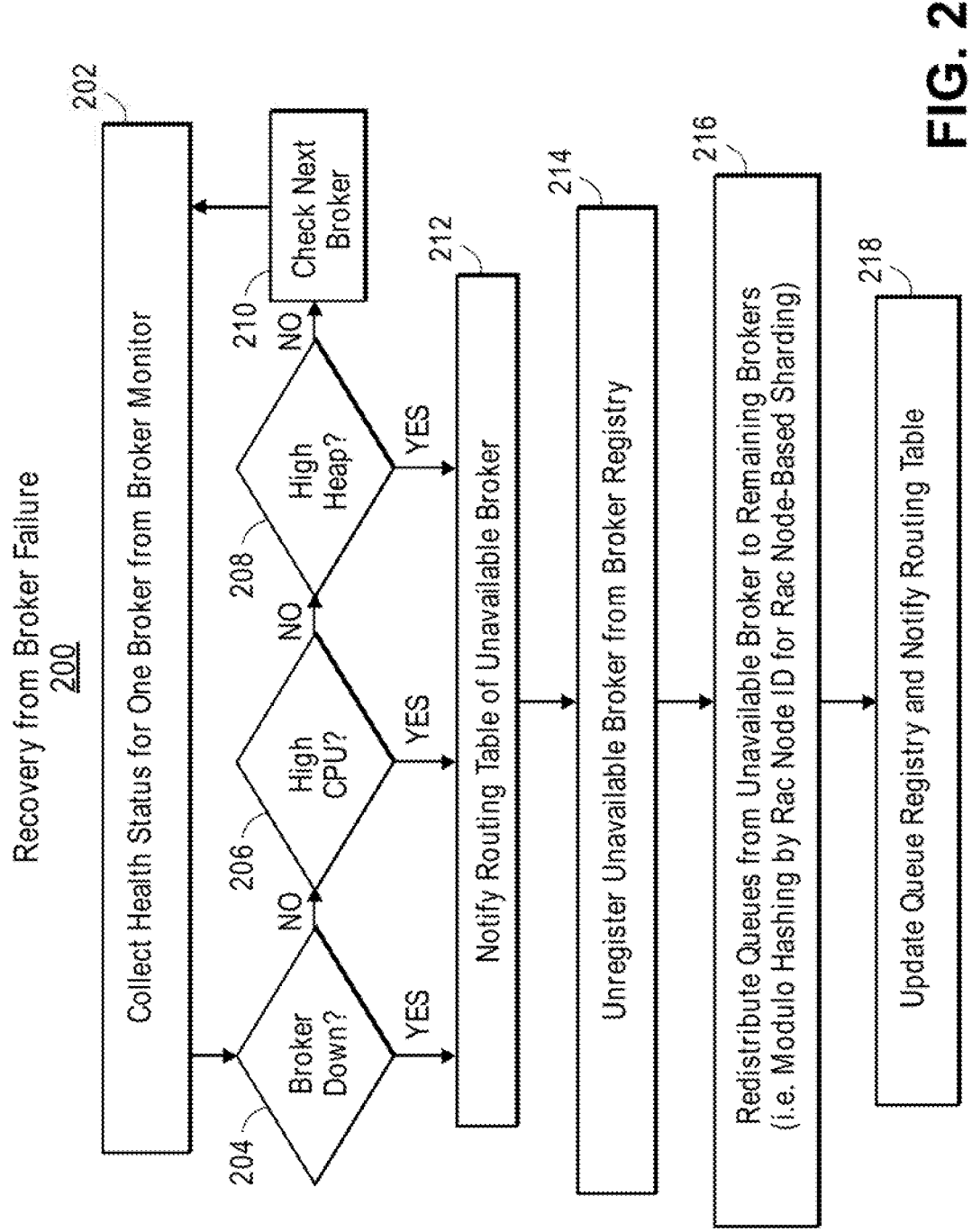
FIG. 2 illustrates a process for recovery from message broker failure according to an embodiment.

FIG. 2 illustrates a process for recovery from message broker failure according to an embodiment. In some embodiments, a process for recovery from broker failure 200 includes collecting health status for a message broker from the broker monitor, such as broker monitor 112 of broker sharding service 110 illustrated in FIG. 1, the collection of health status information includes inquiries regarding whether the message broker is down (is not operating for any reason) 204; whether the message broker has excessively high processor usage (such as CPU, central processing unit usage) 206 (such as a processor usage above a certain threshold amount), and whether the message broker has an excessively high heap value 208 (such as a heap value above a certain threshold amount). However, embodiments are not limited to these particular health status inquiries, or to any particular order of health status inquiries. If answer to each inquiry is negative, indicating that the message broker is available, then the process may continue to a next broker 210.

In some embodiments, if there is a determination by the broker monitor that a message broker is unavailable according to any of inquiries 204, 206, and 208, then the broker service notifies the routing table regarding the unavailable message broker 212, and unregisters the unavailable broker from the broker registry 214 (such as broker registry 114 illustrated in FIG. 1).

In some embodiments, the queues of the unavailable message broker are redistributed to remaining brokers, such as by modulo hashing by RAC node ID for RAC node-based sharding 216. The broker service may then update the queue registry and notify the routing table 218.

Figure 3:
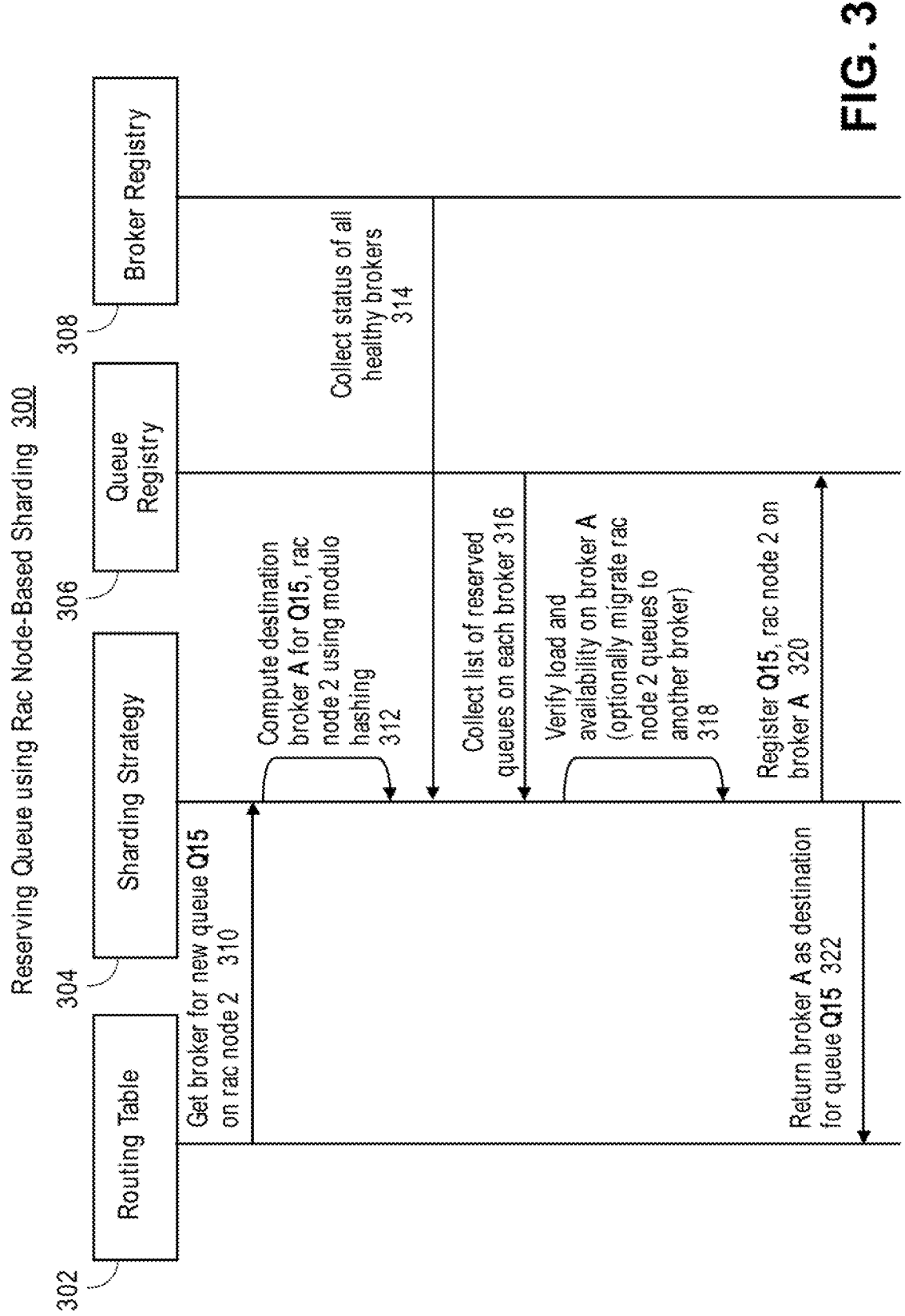
FIG. 3 is a diagram to illustrate reservation of a queue using RAC node-based sharding according to an embodiment.

FIG. 3 is a diagram to illustrate reservation of a queue using RAC node-based sharding according to an embodiment. In a queue reservation process 300, a routing table 302 may operate to obtain a message broker for a new queue (Q15 in this example) on a particular RAC node (RAC node 2) 310 according to a current sharding strategy 304.

In some embodiments, a destination broker A is computed for queue Q15, RAC node 2 using modulo hashing 312. In some embodiments, a status of all healthy message brokers is collected 314 by the broker registry 308, and a list of reserved queues on each message broker is collected 316 from the queue registry 306. In some embodiments, the load and availability on message broker A is verified 318, with RAC node 2 queues optionally being relocated to another broker as needed.

In some embodiments, the queue Q15, RAC node 2 is registered on message broker A 320 using queue registry 306. In some embodiments, broker A is returned to the routing table as the destination for queue Q15 322.

In RAC node-based sharding, migration of existing traffic may be necessary in order to preserve round robin fairness across queues within the same RAC node. Round robin fairness means that every physical queue within the same RAC node partition has an equal or near equal chance of being selected for de-queue and processing. That is, if queues A and B belong to the same RAC node, then for every X messages a system de-queues and processes from queue A, the system should de-queue, on average, X messages from queue B. In some embodiments, this guarantee or goal is provided between queues assigned to the same message broker but not across multiple brokers.

In an example, ACS_DELETE traffic on RAC node 1, tier 1 is routed to a queue on message broker A while APEX_FUTURE on RAC node 1, tier 1 is routed to a queue on message broker B. If the volume of messages on broker A is much higher, then it will adversely impact dequeue performance on broker A such that APEX_FUTURE messages are dequeued at a faster rate from Broker B than ACS_DELETE messages. If queues within the same RAC node are restricted to a single message broker, then this problem may be avoided by virtue of selecting messages in a round-robin fashion across queues within the same broker. As such, following broker failure, messages for all queues belonging to the same RAC node are migrated to a single, remaining broker.

In some embodiments, periodically (for example, every fifteen minutes), a routing table sweeper job runs to enforce fair usage, handle broker failures, add rules for new message types, and other functions. In some embodiments, two additional extra processes may be added to enforce the broker sharding strategy. First, new message brokers added to the system are registered with the sharding service and failed message brokers are unregistered. Next, after the routing table sweeper job loads the list of currently reserved queues, the routing table sweeper job queries the broker sharding service to redistribute existing queues among the set of available message brokers (i.e. load balancing queues from a RAC node to a newly introduced broker). This redistribution logic may be encapsulated in the QpidBrokerSharding interface. Finally, when reserving a queue for each newly created routing rule, the sharding service is queried for the destination message broker ID and then there is an attempt to select an unused queue from that broker. Similarly, when routing rules are removed, the corresponding queue is released from its destination broker.

Figure 4:
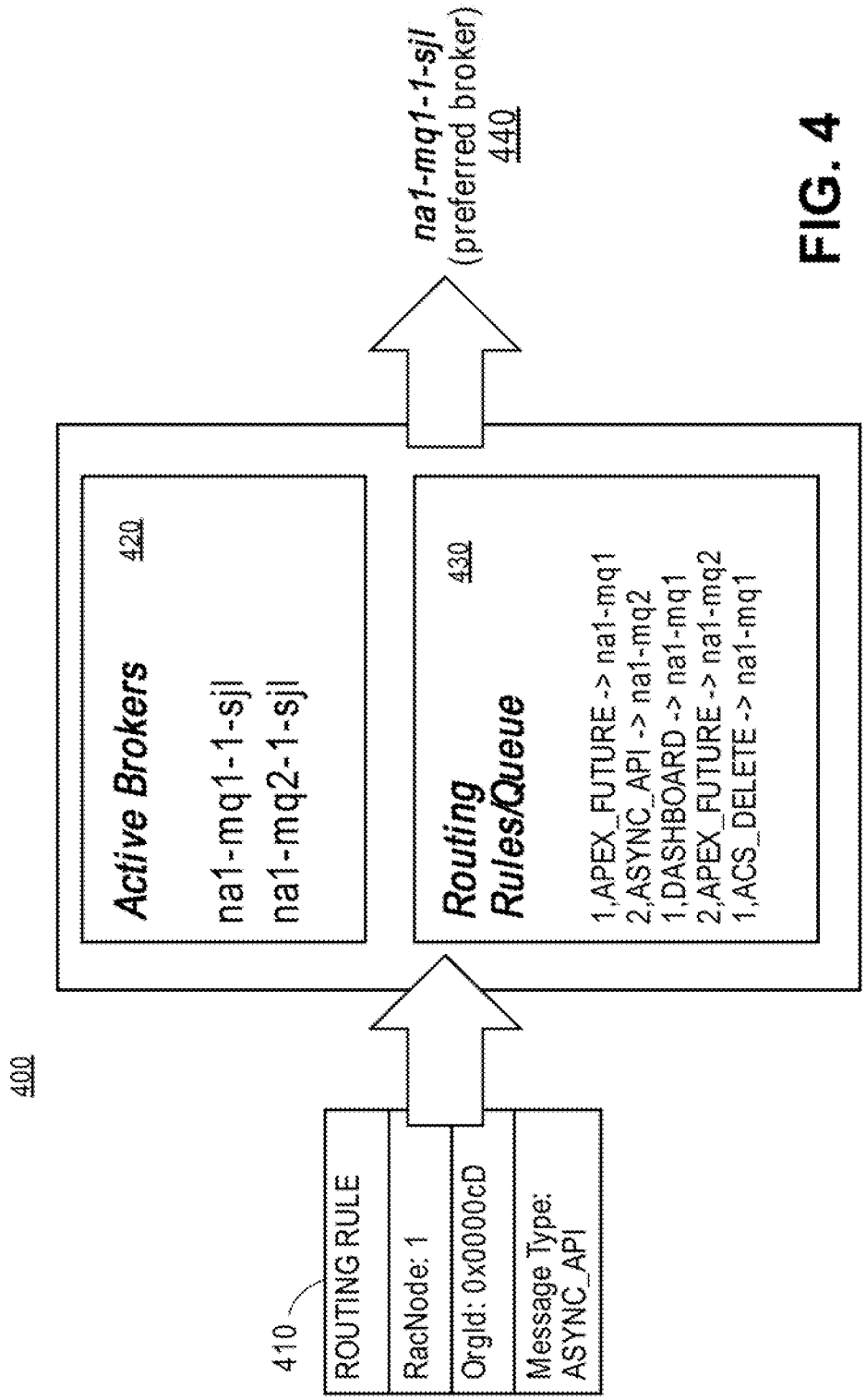
FIG. 4 is an illustration of a broker sharding interface according to an embodiment.

FIG. 4 is an illustration of a broker sharding interface according to an embodiment. In some embodiments, the interface 400 (QpidBrokerSharding Interface) includes a listing of active brokers 420 and routing rules/queue 430. In one example, a particular routing rule 410 may indicate a RAC Node (RAC Node 1 in this example); an organization identification (OrgId=0x0000 cD) for a tenant; and a message type (ASYNC_API). In some embodiments, interface 400 will determine a preferred message broker 440 (na1-mq1-1-sj1 in this example).

Figure 5:
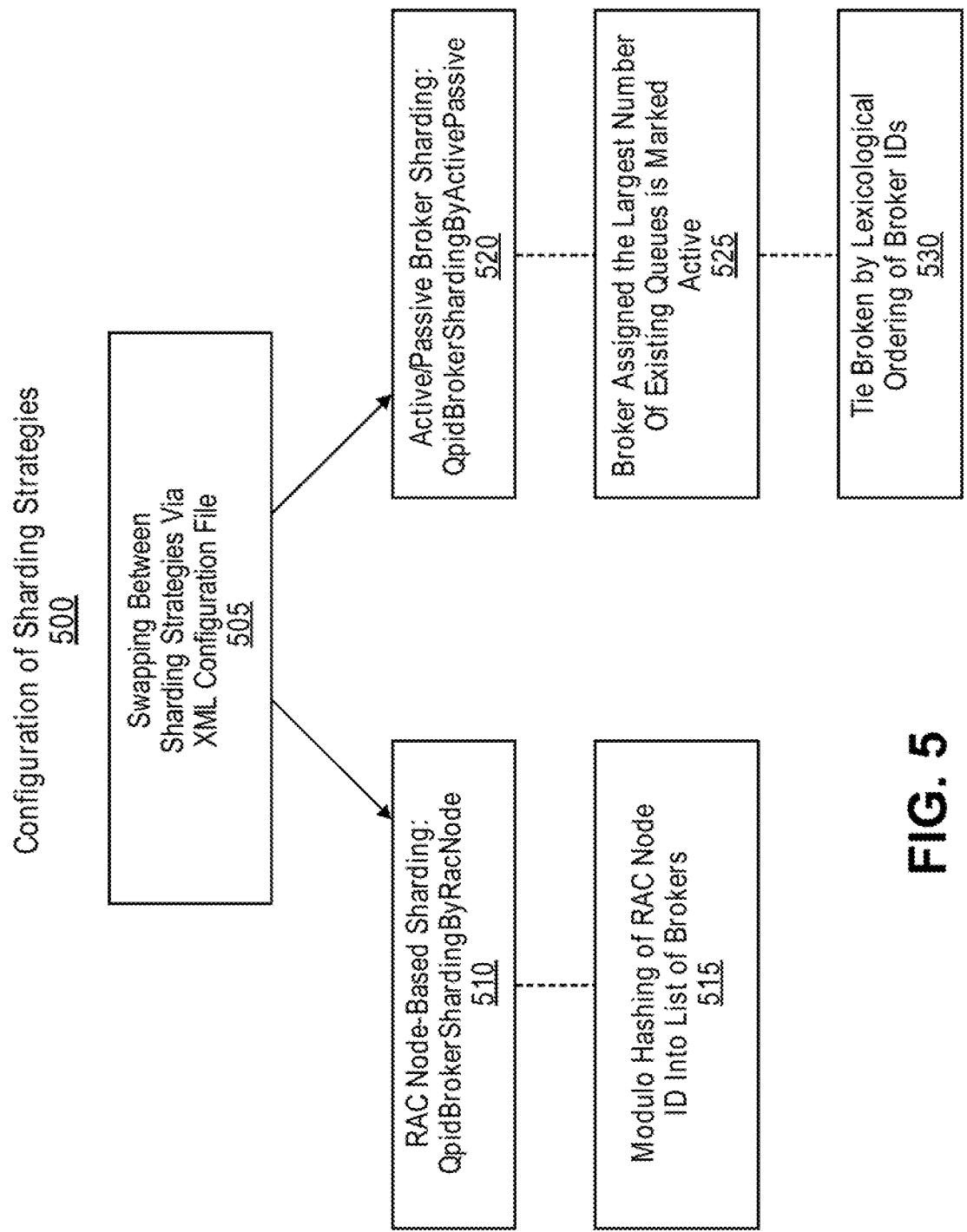
FIG. 5 is an illustration of configuration of sharding strategies according to an embodiment.

FIG. 5 is an illustration of configuration of sharding strategies according to an embodiment. In some embodiments, a configuration of sharding strategies 500 provides for swapping between multiple sharding strategies via the illustrated XML configuration file 505. In some embodiments, the possible sharding strategies include, but are not limited to, RAC node-based sharding (QpidBrokerShardingByRacNode) 510 and active/passive broker sharding (QpidBrokerShardingByActivePasive) 520.

In some embodiments, the RAC node-based sharding 510 includes modulo hashing of a RAC node ID into a list of active brokers 515.

In some embodiments, the active/passive broker sharding 520 includes a broker that is assigned the largest number of existing queues being marked as the "active" broker 525, wherein a tie is broken by lexicological ordering of broker IDs for the available brokers 530.

In some embodiments, in conjunction with broker sharding as a service, two additional components are modified that impact how queues are reserved for new routing rules and which broker is use for reserved and delayed queues. When attempting to reserve a queue for a new routing rule, a preferred broker ID is attached based on the sharding strategy. In an implementation, if there are no available queues on the preferred message broker, rather than reserving a queue from an alternate broker, the reservation operation terminates with an error. This preserves round robin fairness by grouping all queues belonging to the same RAC node on the same broker.

In addition, an embodiment may include selecting a delayed (for messages enqueued with a delay) or reserved (for messages enqueued before the routing table is loaded) queue, with the destination message broker being the broker with the lowest lexicologically ordered ID. In an implementation in which there is sharding by RAC node, traffic will be evenly distributed across each broker. As a result, if a service continues to use only delayed queues on the broker with the lowest lexicologically ordered ID, then there is a need to update the broker ID in the message transaction table of the database for, on average, (N−1)/N fraction of the delayed messages for a set of N message brokers. This results because, on average, N−1 out of N messages will be routed to queues residing on a different broker (according to the RAC node of the message) rather than the delayed queue once the delay expires.

In some embodiments, in order to prevent unnecessary broker ID updates to the message transaction table, the router object (QpidMessageQueueRouter) is augmented to be sharding aware. Sharding awareness means that, when the router assigns delayed or reserved queues to incoming messages, the router queries the sharding service to retrieve the preferred broker based on the RAC node of the newly enqueued message. This process may be used to ensure the same destination broker is used before and after a delayed message expires. The local cache of the sharding service state (referenced by the router) is updated at periodic (for example, 5-minute) intervals by the routing table sweeper job. The cache can be stale such that messages enqueued with a delay may be routed to an incorrect broker immediately following a broker failure.

Figure 6:
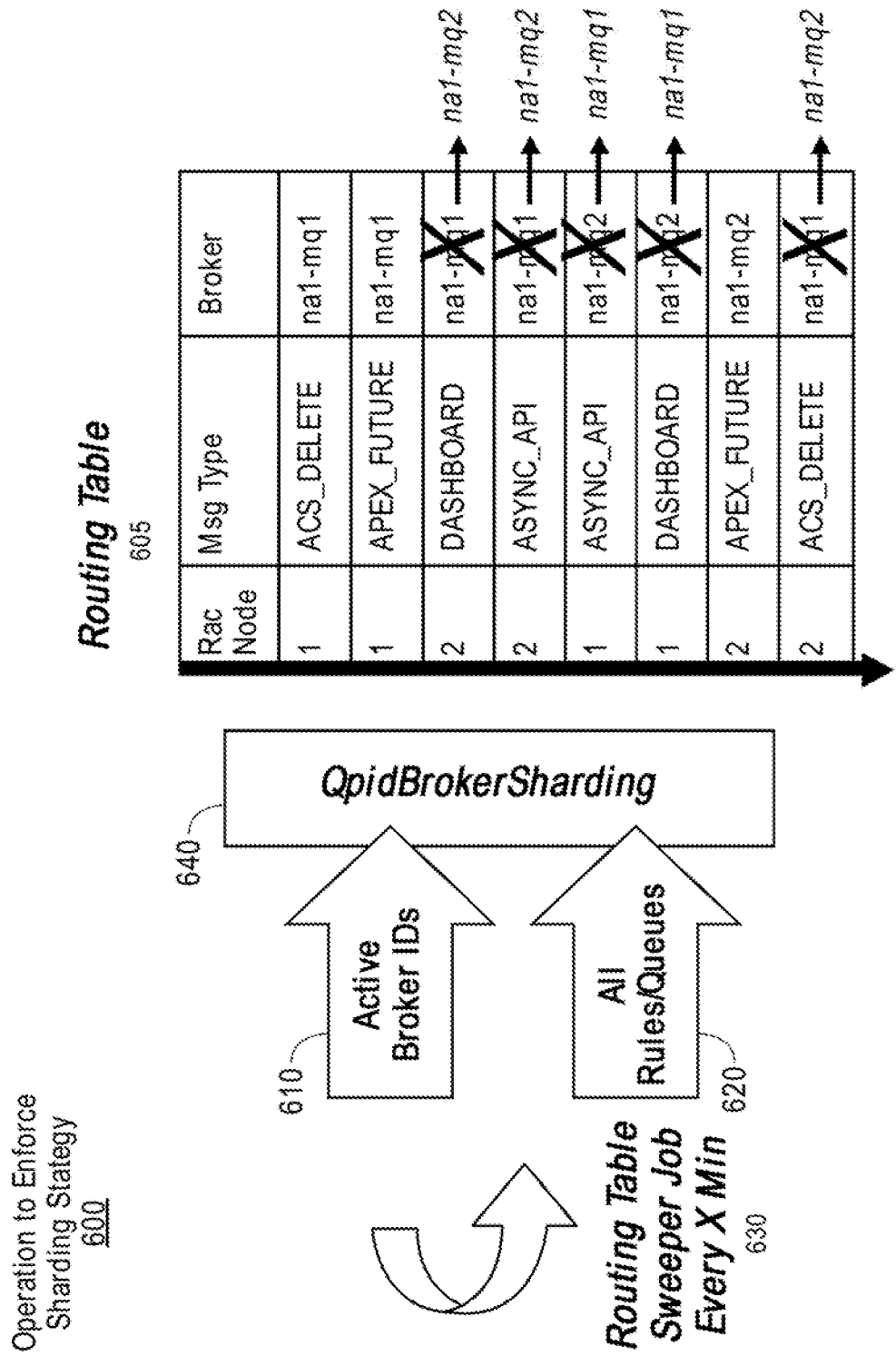
FIG. 6 illustrates an operation to enforce a sharding strategy according to an embodiment.

FIG. 6 illustrates an operation to enforce a sharding strategy according to an embodiment. In some embodiments, in an operation to enforce a sharding strategy 600, an interface (QpidBrokerSharding) 640 operates with a routing table 605. As illustrated, active broker IDs 610 and all rules/queues 620 are received for handling by the interface 640.

In some embodiments, a router table sweeper job 630 may provide updates at certain X-minute intervals 630, wherein the routing table sweeper job operates to enforce the chosen sharding strategy.

In the illustration provided in FIG. 6, the routing table sweeper job 630 provides correction of broker routing to enforce the chosen sharding strategy such as, in this example, modifying broker assignments for RAC node 2 to be directed to preferred broker na1-mq2 and RAC node 1 to be directed to preferred broker Na1-mq1.

In some embodiments, a sharding strategy is provided by implementing the QpidBrokerSharding interface, including the following operations:

(a) getPreferredBrokerIdForRule: Returns the broker ID for the specified routing rule or RAC node.

(b) setAvailableBrokerIds: Initializes the set of Qpid brokers that are available for enqueue/dequeue.

(c) setInUseRoutingRules: Initializes the set of routing rules/queues currently reserved by the router. Queues may be mapped to a failed broker, in which case the sharding strategy will release the prior queue and reserve a replacement queue on one of the remaining brokers.

(d) remapRulesToBrokers: Re-compute the assignment of rules/queues to brokers. In an implementation, setInUseRoutingRules is to be invoked before calling getPreferredBrokerIdForRule. In some embodiments, the sequencing of these processes is handled automatically by the routing table sweeper job.

In some embodiments, in order to change the Qpid broker sharding strategy, the "BrokerShardingStrategy" parameter is updated via an XML configuration file. In some embodiments, the sharding strategy may be dynamically changed as needed.

Figure 7:
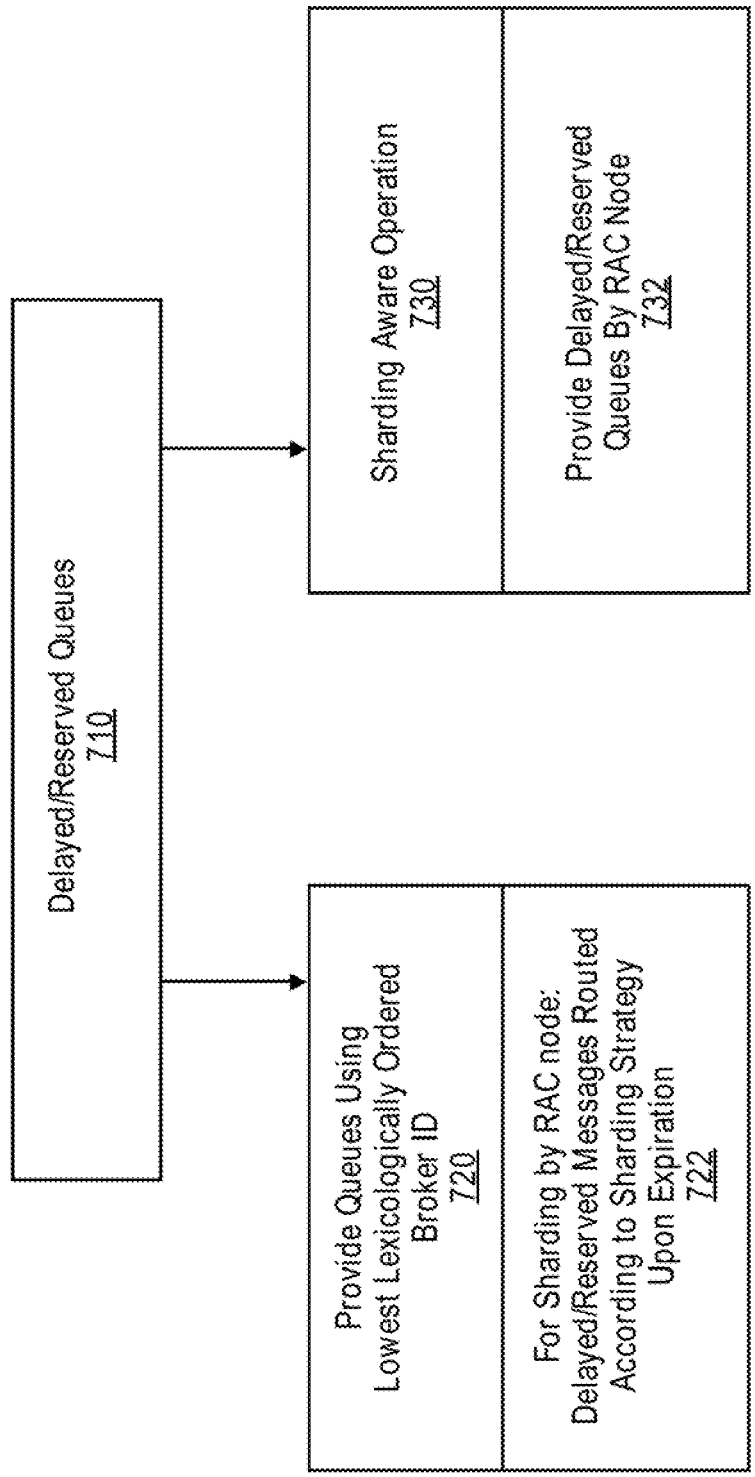
FIG. 7 is an illustration of handling of delayed or reserved queues including sharding aware operation according to an embodiment.

FIG. 7 is an illustration of handling of delayed or reserved queues including sharding aware operation according to an embodiment. In some embodiments, handling of delayed/reserved queues 700 may be addressed with one of multiple different strategies. For delayed/reserved queues 700, a first strategy provides queues according to lexicological ordering of broker IDs, such as using the lowest lexicologically ordered broker ID 720. In operation, for sharding by RAC node, delayed or reserved messages are routed according the sharding strategy upon expiration 722.

However, in such process in which queues are partitioned across multiple brokers, sharding by RAC node will mean that a large percentage of delayed/reserved messages, such as approximately 50% in balancing between two brokers, will be routed to a different broker upon expiration, requiring many database operations to update the message transaction table of the database.

In some embodiments, a second alternative strategy utilizes sharding aware operation 730. In some embodiments, there is reference to the sharding service in the router, and in operation delayed/reserved queues are provided by RAC node, thereby eliminating the need to update the broker ID of delayed/reserved messages in the message transaction table.

In some embodiments, a method of sharding message traffic across messaging brokers includes: providing a message sharding service for message sharding among a plurality of registered message brokers, wherein providing the message sharding service includes applying a current message sharding strategy, the current message sharding strategy being one of a plurality of message sharding strategies; and sharding messages among the registered message brokers according to the current message sharding strategy, including registering the message brokers and assigning message queues to registered message brokers according to the current message sharding strategy; wherein the current message sharding strategy is one of a plurality of message sharding strategies.

In some embodiments, a method for recovery from message broker failure includes: determining a health status of each of a plurality of message brokers by a broker monitor of a broker sharding service; upon determining that a first message broker is unavailable, notifying a routing table regarding the unavailable broker; redistributing message queues from the first message broker to one or more remaining message brokers according to a selected message sharding strategy, the selected message sharding strategy being implemented by the broker sharding service; and notifying the routing table regarding the redistribution of message queues.

In some embodiments, a messaging system includes: a plurality of message brokers, the message brokers to store queues of message; a routing table to map message types and tenants to physical queues on the message brokers; and a message sharding service to provide message sharding among the plurality of message brokers according to a message sharding strategy; wherein the message sharding service is operable to switch between two or more message sharding strategies.

In some embodiments, a non-transitory computer-readable storage medium having stored thereon data representing sequences of instructions that, when executed by a processor, cause the processor to perform operations including: providing a message sharding service for message sharding among a plurality of registered message brokers, wherein providing the message sharding service includes applying a current message sharding strategy; and sharding messages among the registered message brokers according to the current message sharding strategy, including registering the message brokers and assigning message queues to registered message brokers according to the current message sharding strategy; wherein the current message sharding strategy is one of a plurality of message sharding strategies.

The examples illustrating the use of technology disclosed herein should not be taken as limiting or preferred. This example sufficiently illustrates the technology disclosed without being overly complicated. It is not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Figure 8:
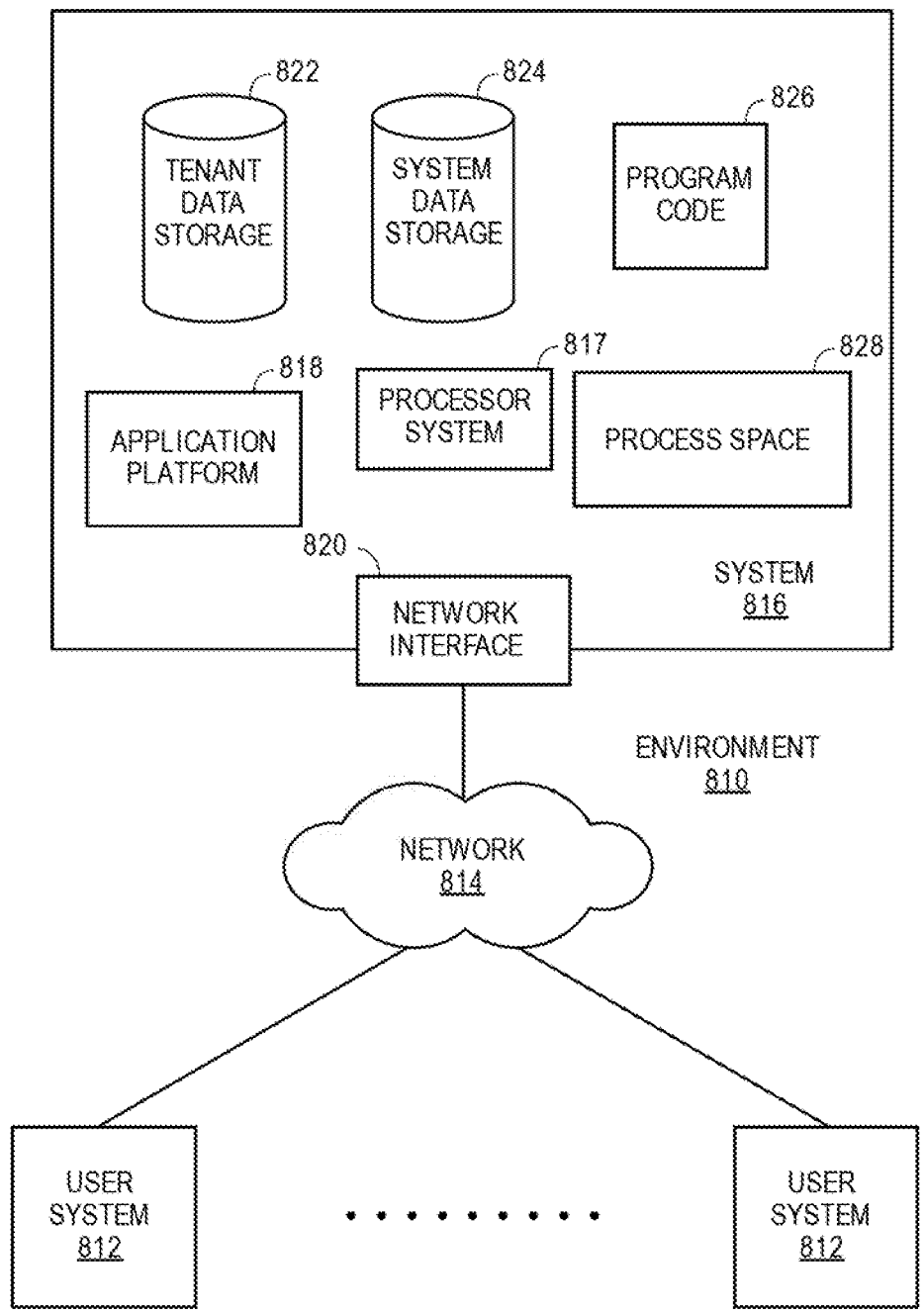
FIG. 8 illustrates a block diagram of an environment providing conditional selection of compound objects according to an embodiment.
Figure 9:
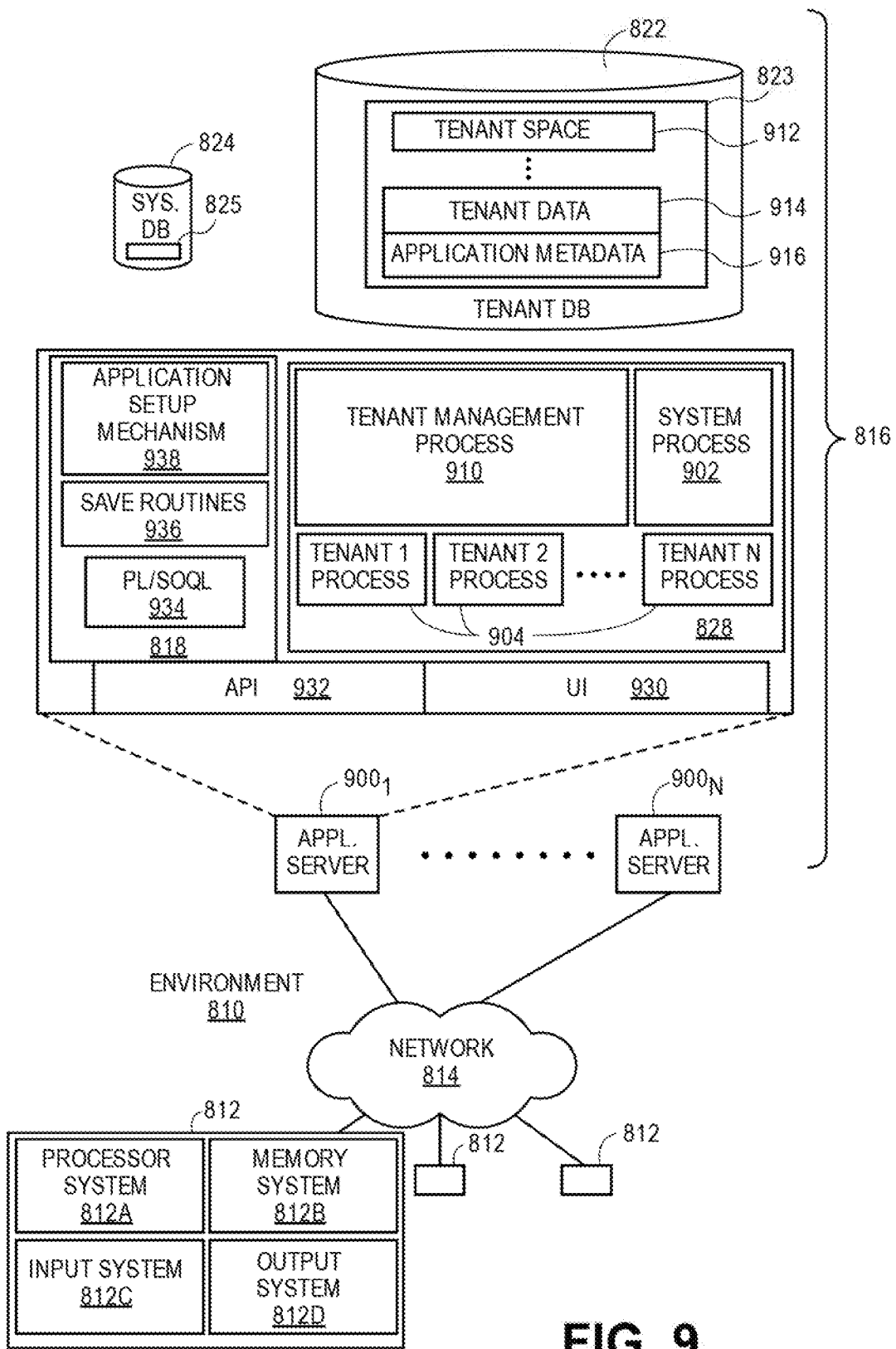
FIG. 9 illustrates details of an environment providing conditional selection of compound objects according to an embodiment.

FIG. 8 illustrates a block diagram of an environment providing conditional selection of compound objects according to an embodiment, and FIG. 9 illustrates details of an environment providing conditional selection of compound objects according to an embodiment. Components within an environment 810 may belong to different layers (e.g., compute, management) and may communicate as described above. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8, and in more detail in FIG. 9, user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein.

A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that are used in one or more implementations may not be so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system

816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop or notebook, tablet computer, smart phone, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer, Firefox, Chrome, or a mobile operating system browser in the case of a smart phone, cellular phone, or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen, gesture recognition, or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel processor, including Celeron®, Pentium®, Core®, and Xeon® processors, or the like. Similarly, system 816 (and additional instances of an MTS, where more than one is present) and all of their components might be operator configurable using application(s) including computer code to run using a central processing unit such as processor system 817, which may include an Intel processor or the like, and/or multiple processor units.

A computer program product embodiment includes a machine-readable storage medium (media), including non-transitory computer-readable storage media, having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SQL 934, save routines 936, application setup mechanism 938, applications servers $900_1$-$900_N$, system process space 902, tenant process spaces 904, tenant management process space 910, tenant storage space 912, tenant data 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (illustrated in FIG. 8) implemented as a set of HTTP application servers 900, an application platform 818, tenant data storage 822, and system data storage 824.

Also shown in FIG. 9 is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage spaces 912, which can be either a physical arrangement and/or a logical arrangement of data. Within each tenant storage space 912, tenant data 914 and application metadata 916 might be similarly allocated for each user. For example, a copy of a user's most recently used (MRU) items might be stored to tenant data 914. Similarly, a copy of MRU items for an entire organization that is a tenant might be stored to tenant storage space 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SQL 934 that provides a programming language style interface extension to API 932. A detailed description of some PL/SQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. As indicated above, U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. A method of sharding data across servers, the method comprising:
    providing a sharding service to provide data sharding among a plurality of shard servers, wherein providing the sharding service includes:
    selecting a first sharding method to be a current sharding method of the sharding service, the first sharding method of the sharding service being one of a plurality of available sharding methods for the sharding service;
    sharding data according to the first sharding method of the sharding service, including distributing data to the plurality of shard servers according to the first sharding method; and
    switching the current sharding method of the sharding service from the first sharding method to a second sharding method of the plurality of available sharding methods of the sharding service, and sharding data among the plurality of shard servers according to the second sharding method.

2. The method of claim 1, wherein switching the current sharding method includes adding one or more shard servers to or removing one or more shard servers from the plurality of shard servers.

3. The method of claim 1, further comprising the sharding service enforcing the current sharding method for distributing data among the plurality of shard servers.

4. The method of claim 1, further comprising monitoring workload and status of the shard servers of the plurality of shard servers.

5. The method of claim 1, wherein switching the current sharding method of the sharding service from the first sharding method to the second sharding method includes switching in response to one or more instructions regarding the sharding method.

6. The method of claim 1, wherein switching the current sharding method of the sharding service from the first sharding method to the second sharding method includes switching in response to one or more of a change in current conditions or a change in a user preference.

7. The method of claim 1, wherein providing the sharding service includes providing a plurality of instructions for data operations.

8. The method of claim 7, wherein the plurality of instructions includes one or more of instructions to:
    add a shard server to the plurality of shard servers for the sharding service;
    remove a shard server from the plurality of server servers for the sharding service; or
    switch the current sharding method of the sharding service.

9. A system comprising:
    a plurality of shard servers, the shard servers to store shards of data; and
    a sharding service to provide data sharding among the plurality of shard servers according to a current sharding method, including selecting a first sharding method to be the current sharding method of the sharding service, wherein the first sharding method is one of a plurality of available sharding methods for the sharding service, and distributing data to the plurality of shard servers according to the first sharding method;

wherein the sharding service is operable to switch from the first sharding method to a second sharding method of the plurality of available sharding methods, and to shard data among the plurality of shard servers according to the second sharding method.

10. The system of claim 9, wherein the sharding service switching the current sharding method includes the sharding service adding one or more shard servers to or removing one or more shard servers from the plurality of shard servers.

11. The system of claim 9, wherein the sharding service is to enforce the current sharding method for distributing data among the plurality of shard servers.

12. The system of claim 9, wherein the sharding service is further to monitor workload and status of the shard servers of the plurality of shard servers.

13. The system of claim 9, wherein the sharding service provides a plurality of instructions for data operations.

14. The system of claim 13, wherein the plurality of instructions includes one or more of instructions to:
add a shard server to the plurality of shard servers for the sharding service;
remove a shard server from the plurality of shard servers for the sharding service; or
switch the current sharding method of the sharding service.

15. The system of claim 9, wherein the sharding service decouples the sharding method from other components of the system.

16. A non-transitory computer-readable storage medium having stored thereon data representing sequences of instructions that, when executed by a processor, cause the processor to perform operations comprising:
providing a sharding service to provide data sharding among a plurality of shard servers, wherein providing the sharding service includes:
selecting a first sharding method to be a current sharding method of the sharding service, the first sharding method of the sharding service being one of a plurality of available sharding methods for the sharding service;
sharding data among the plurality of shard servers according to the first sharding method of the sharding service, including distributing data to the plurality of shard servers according to the first sharding method; and
switching the current sharding method of the sharding service from the first sharding method to a second sharding method of the plurality of available sharding methods of the sharding service, and sharding data among the plurality of shard servers according to the second sharding method.

17. The medium of claim 16, wherein switching the current sharding method includes adding one or more shard servers to or removing one or more shard servers from the plurality of shard servers.

18. The medium of claim 16, further comprising instructions that, when executed by the processor, cause the processor to perform operations comprising:
enforcing the current sharding method for distributing data among the plurality of shard servers.

19. The medium of claim 16, further comprising instructions that, when executed by the processor, cause the processor to perform operations comprising:
monitoring workload and status of the shard servers of the plurality of shard servers.

20. The medium of claim 16, wherein switching the current sharding method of the sharding service from the first sharding method to the second sharding method includes switching in response to one or more instructions regarding the sharding method.

21. The medium of claim 16, wherein switching the current sharding method of the sharding service from the first sharding method to the second sharding method includes switching in response to one or more of a change in current conditions or a change in a user preference.

22. The medium of claim 16, wherein providing the sharding service includes providing a plurality of instructions for data operations.

23. The medium of claim 22, wherein the instructions for data sharding operations include one or more of instructions to:
add a shard server to the plurality of shard servers for the sharding service;
remove a shard server from the plurality of shard servers for the sharding service; or
switch the current sharding method of the sharding service.

* * * * *